United States Patent
Poch et al.

(10) Patent No.: US 11,180,094 B2
(45) Date of Patent: Nov. 23, 2021

(54) INSULATING ELEMENT FOR A STRUCTURAL ELEMENT OF A MOTOR VEHICLE

(71) Applicant: SIKA TECHNOLOGY AG, Baar (CH)

(72) Inventors: Sven Poch, Hünenberg See (CH); Paul Blowing, Unterschleissheim (DE)

(73) Assignee: SIKA TECHNOLOGY AG, Baar (CH)

( * ) Notice: Subject to any disclaimer, the term of this patent is extended or adjusted under 35 U.S.C. 154(b) by 65 days.

(21) Appl. No.: 16/700,273

(22) Filed: Dec. 2, 2019

(65) Prior Publication Data
US 2020/0172025 A1   Jun. 4, 2020

(30) Foreign Application Priority Data
Nov. 30, 2018   (EP) .................................. 18209438

(51) Int. Cl.
*B60R 13/08*   (2006.01)
*B62D 29/00*   (2006.01)
*B62D 25/04*   (2006.01)

(52) U.S. Cl.
CPC ........ *B60R 13/0815* (2013.01); *B62D 29/002* (2013.01); *B62D 25/04* (2013.01)

(58) Field of Classification Search
CPC .. B60R 13/0815; B62D 29/002; B62D 29/04; B62D 25/00
USPC ......................... 296/187.02, 193.06, 187.06
See application file for complete search history.

(56) References Cited

U.S. PATENT DOCUMENTS

| | | | |
|---|---|---|---|
| 5,266,133 A | 11/1993 | Hanley et al. | |
| 5,373,027 A | 12/1994 | Hanley et al. | |
| 2015/0165737 A1 | 6/2015 | Richardson et al. | |
| 2018/0022397 A1 | 1/2018 | Richardson et al. | |

FOREIGN PATENT DOCUMENTS

| | | | | |
|---|---|---|---|---|
| DE | 102010028943 A1 | * | 11/2011 | ........... B62D 29/002 |
| EP | 0 204 970 A2 | | 12/1986 | |
| GB | 2463858 A | | 3/2010 | |
| KR | 940009348 B1 | * | 10/1994 | ............ B62D 25/04 |
| WO | 01/58741 A1 | | 8/2001 | |
| WO | 2005/080524 A1 | | 9/2005 | |

(Continued)

OTHER PUBLICATIONS

Aurelie et al. and Henkel AG, "Structural Element", Nov. 17, 2011, European Patent Office, DE102010028943A1 (Year: 2011).*

(Continued)

*Primary Examiner* — Dennis H Pedder
*Assistant Examiner* — Joyce Eileen Hill
(74) *Attorney, Agent, or Firm* — Oliff PLC

(57) ABSTRACT

A structural element of a motor vehicle has a cavity and an elongate insulating element arranged in the cavity and is formed such that a longitudinal axis of the insulating element is oriented substantially parallel to a longitudinal axis of the cavity and the insulating element comprises an expandable material, which is arranged and/or configured in such a way that the insulating element fills the cavity completely along the entire length of the insulating element when the expandable material is in the expanded state.

15 Claims, 4 Drawing Sheets

(56) References Cited

FOREIGN PATENT DOCUMENTS

WO     WO-2009036784 A1 *   3/2009   ............ C08L 53/025

OTHER PUBLICATIONS

Miller et al.,"Cavity Sealing Arrangement and Method," Oct. 7, 1994, Korean Patent Office and Clarivate Analytics, KR940009348B1 (Year: 1994).*

May 17, 2019 Search Report issued in European Patent Application No. 18209438.3.

* cited by examiner

INSULATING ELEMENT FOR A STRUCTURAL ELEMENT OF A MOTOR VEHICLE

TECHNICAL FIELD

The invention relates to a structural element of a motor vehicle, wherein the structural element has a cavity and an elongate insulating element is arranged in the cavity. The invention also relates to an insulating element for insulating structural elements in motor vehicles.

PRIOR ART

In many cases, components, such as for example bodies and/or frames of transportation and conveyance means, in particular of motor vehicles, have structures with cavities in order to make lightweight constructions possible. However, these cavities cause a wide variety of problems. Depending on the nature of the cavity, it must be sealed in order to prevent the ingress of moisture and dirt, which can lead to the corrosion of the components. It is often also desirable to reinforce the cavities, and consequently the component, but to retain the low weight of this type of construction. It is often also necessary to insulate the cavities, and consequently the components, in order to reduce noises or vibrations which can otherwise be transmitted along or through the cavity. Moreover, many of these cavities have an irregular shape or a narrow extent, making it more difficult to seal, to reinforce or to damp them properly.

In particular in automotive construction, but also in aircraft construction and boat building, sealing elements (baffles) are therefore used in order to seal and/or acoustically isolate cavities, and reinforcing elements (reinforcers) are used in order to reinforce cavities.

Likewise known in this context is the use of filling foams, for example 2-component polyurethane foams, which are introduced into the cavities in order to isolate them against noise, water, moisture and dust, and to improve the noise and vibration absorption behaviour. Filling foams of this type are usually injected in fluid form through small openings into the cavities, where the actual foam formation takes place as a result of a previous chemical activation. Such a 2-component polyurethane-based filling foam for sealing vehicle cavities is commercially available, for example under the name SikaBaffle®-278.

In particular with regard to vibration or sound insulation, the solutions currently known are not completely satisfactory. Conventional sealing elements generally only allow vibration or sound damping to be achieved in the longitudinal direction of the sealed cavity. Moreover, when introducing filling foams from outside, control over the distribution of the foams in the cavities is only possible to a limited extent and costly apparatuses for introducing the foams are required and must be adapted to the particular vehicle types.

There is therefore still a need for improved solutions that do not have, or have to a reduced extent, the above-mentioned disadvantages.

SUMMARY OF THE INVENTION

The invention is based on the object of providing an improved solution for the acoustic insulation of structural elements in motor vehicles. In particular, the intention is to make acoustic insulation possible in the longitudinal direction and in the transverse direction of a cavity at the same time. The intention is also for the solution to be as far as possible more cost-effective and easier to manage than conventional known systems.

It has surprisingly been found that the object can be achieved by the features of the main claim. Accordingly, the essence of the invention is a structural element of a motor vehicle, wherein the structural element has a cavity and an elongate insulating element is arranged in the cavity, wherein a longitudinal axis of the insulating element is oriented substantially parallel to a longitudinal axis of the cavity and wherein the insulating element comprises an expandable material, which is arranged and/or configured in such a way that the insulating element fills the cavity completely along the entire length of the insulating element when the expandable material is in the expanded state.

As has been found, the configuration and arrangement according to the invention of the insulating element make effective sound insulation of a hollow structural element possible along longer portions. For example, longer portions in elongate structural elements, such as for example A-, B- and C-pillars, side sills, wheel wells or roof frames, can be insulated in a targeted and precise manner in defined portions. The reason for this is that the longitudinal axis of the elongate insulating element is oriented substantially parallel to the longitudinal axis of the cavity and the cavity is filled completely along the entire length of the insulating element.

This achieves substantially direction-independent sound insulation. As well as insulation in the longitudinal direction, as can be achieved with conventional baffles if need be, insulation in the transverse direction is also obtained. The reason for this may be that the insulating elements used according to the invention fill the cavity completely in the expanded state, without bridges that transmit sound being formed in the structural element.

Moreover, the insulating elements used according to the invention can be easily inserted into the bodyshell already during production. Subsequent filling of the cavity in the structural element, as in the case of a conventional filling foam, is thus dispensed with, considerably simplifying production and saving costs.

An insulating element which fills the cavity in a substantially complete and precise manner is created by the expansion of the expandable material. In this case, the expanded material is in contact with the inner wall of the cavity over a large area. In particular, this is the case along the entire length of the insulating element.

The expandable material can be adapted in a targeted manner to the cavity to be filled in terms of type, quantity and spatial arrangement such that in the expanded state it is uniformly distributed in the cavity, which has a positive effect on the insulating action.

If the insulating element is manufactured entirely from water-resistant materials, it can also be used in humid or wet environments without any problem.

In particular, the insulating element is formed in such a way that a free space exists between the expandable material in the unexpanded state and a wall of the cavity and at least partially encloses the insulating element along its entire length. In other words, the insulating element is formed in particular in such a way that in the unexpanded state it has a smaller volume than a portion of the cavity in which the insulating element is present. This allows the insulating element to be installed in the cavity without any problem.

A volume of the insulating element in the unexpanded state is in particular in the range from 10-95%, specifically 20-60%, for example 30-40%, of the volume of the cavity portion in which the insulating element is present.

The term "elongate insulating element" should be understood to mean, in short, an insulating element which, at least in the unexpanded state, is in particular longer than a conventional sealing element (baffle) in the unexpanded state.

A ratio of the length of the insulating element in the unexpanded state to a width and/or to a height of the insulating element in the unexpanded state is preferably >0.5, in particular >1, advantageously >1.5, in particular >2, specifically >4, particularly preferably >5 or >7. Preferably, both the ratio of the length of the insulating element in the unexpanded state to the width of the insulating element in the unexpanded state and the ratio of the length of the insulating element in the unexpanded state to the height of the insulating element in the unexpanded state lie in the stated ranges.

A ratio of the length of the insulating element in the unexpanded state to a width and/or to a height of the insulating element in the unexpanded state is preferably at least >1.

In particular, the term "elongate insulating element" means an insulating element in which the length of the insulating element is both greater than the width of the insulating element and greater than the height of the insulating element. This is the case at least in the unexpanded state, preferably in the unexpanded state and in the expanded state.

A length of the insulating element amounts to in particular 5-250 cm, preferably 10-200 cm, specifically 20-150 cm, particularly preferably 30-125 cm or 40-100 cm. A typical width of the insulating element measures e.g. 0.5-30 cm, in particular 1-20 cm, preferably 2-20 cm, specifically 3-15 cm or 4-10 cm. The height of the insulating element can amount to e.g. 0.5-30 cm, in particular 1-20 cm, preferably 2-20 cm, specifically 3-15 cm or 4-10 cm.

A length of the cavity in which the insulating element is present is at least as long as the insulating element, but is preferably longer. A width of the cavity portion in which the insulating element is present measures e.g. 0.5-30 cm, in particular 1-20 cm, preferably 2-20 cm, specifically 3-15 cm or 4-10 cm. A height of the cavity portion in which the insulating element is present measures e.g. 0.5-30 cm, in particular 1-20 cm, preferably 2-20 cm, specifically 3-15 cm or 4-10 cm.

The width and height of the cavity are in particular greater than the width and the height of the insulating element with the expandable material in the unexpanded state.

An "expandable material" is understood in the present case to mean in particular a foamable material.

The expandable material preferably has a rate of expansion of more than 500%©, in particular more than 1 000%, specifically of more than 1 500%. For example, the rate of expansion is in the range from 500-2 000%, preferably 800-1 500%. As a result, the insulating element also has a small volume when there is a relatively small amount of expandable material, ensuring that it is well able to be installed. At the same time, when it expands, an optimal degree of filling can be achieved in the cavity, which brings about effective insulation. For specific applications, however, expandable materials with other rates of expansion can also be used.

In principle, any desired material that can be made to foam in a controlled manner can be used as the expandable material. This material may or may not have reinforcing properties. In the present case, expandable materials without reinforcing properties are preferred.

The expandable material is typically configured in such a way that it can be foamed thermally, by moisture and/or by electromagnetic radiation.

Such an expandable material typically comprises a chemical and/or a physical foaming agent. Chemical foaming agents are organic and/or inorganic compounds which decompose under the influence of temperature, moisture and/or electromagnetic radiation, at least one of the decomposition products being a gas. Compounds which transition into the gaseous state of aggregation when the temperature is increased may for example be used as physical foaming agents. As a result, both chemical and physical foaming agents are capable of creating foam structures in polymers.

The expandable material is preferably foamed thermally, with chemical foaming agents being used. Examples of suitable chemical foaming agents are azodicarbonamides, sulfohydrazides, hydrogen carbonates or carbonates.

Suitable foaming agents are, for example, also commercially available under the trade name Expancel® from Akzo Nobel, the Netherlands, or under the trade name Celogen® from Chemtura Corp., USA. The heat required for the foaming can be introduced by external or by internal heat sources, such as an exothermic chemical reaction.

The expandable material is preferably foamable at a temperature of <200° C., preferably <160° C., in particular of 80° C. to 150° C., preferably of 90° C. to 140° C. In particular, this is over a period of time of 10-60 min. In this way, said expandable material can be foamed in already established process steps in vehicle manufacturing.

Examples of suitable expandable materials are single-component epoxy resin systems which do not flow at room temperature and in particular have an enhanced impact strength and contain thixotropic agents such as aerosils or nanoclays. For example, epoxy resin systems of this type include 20 to 50% by weight of a liquid epoxy resin, 0 to 30% by weight of a solid epoxy resin, 5 to 30% by weight of impact modifiers, 1 to 5% by weight of physical or chemical foaming agents, 10 to 40% by weight of fillers, 1 to 10% by weight of thixotropic agents and 2 to 10% by weight of heat-activatable catalysts. Suitable impact modifiers are reactive liquid rubbers based on nitrile rubber or derivatives of polyether polyol polyurethanes, core-shell polymers and similar systems known to a person skilled in the art.

Likewise suitable foamable materials are one-component polyurethane compositions containing foaming agents and based on crystalline polyesters comprising OH groups and mixed with further polyols, preferably polyether polyols, and polyisocyanates with blocked isocyanate groups. The melting point of the crystalline polyester should be >50° C. The isocyanate groups of the polyisocyanate can be blocked, for example by nucleophiles such as caprolactam, phenols or benzoxalones. Also suitable are blocked polyisocyanates such as are used, for example, in powder-coating technology and are commercially available, for example, under the trade names Vestagon® BF 1350 and Vestagon® BF 1540 from Degussa GmbH, Germany. Likewise suitable as isocyanates are so-called encapsulated or surface-deactivated polyisocyanates which are known to a person skilled in the art and are described, for example, in EP 0 204 970.

Also suitable as expandable materials are two-component epoxy/polyurethane compositions containing foaming agents, such as are described, for example, in WO 2005/080524 A1.

Also suitable as expandable materials are ethylene-vinyl acetate compositions containing foaming agents.

Likewise suitable foamable materials are sold, for example, under the trade name SikaBaffle® 240, SikaBaffle® 250 or SikaBaffle® 255 by Sika Corp., USA and are described in U.S. Pat. Nos. 5,266,133 and 5,373,027.

In one preferred embodiment, the expandable material is configured in such a way that in the expanded state it forms an open cell structure. In open cell structures, the cell walls are not closed, or are open, in the expanded or foamed state of the material. The individual cells are thus in fluidic communication with one another. In principle, however, the expandable material can also be configured in such a way that in the expanded state it forms a closed cell structure or a mixed cell structure. Even though other structures are possible in principle, the open cell structure has proven to be particularly expedient with respect to sound insulation.

Preferably, the expandable material has a modulus of elasticity of at most 20 MPa. In a refinement, the second material has a modulus of elasticity of at most 10 MPa, preferably of at most 5 MPa. The values specified with respect to the modulus of elasticity relate to the expandable material in the state of use thereof in the structural element. This means that the values are specified in particular after a possible expansion of the material and after a possible hardening of the material.

According to a further advantageous embodiment, the insulating element comprises a base, on which the expandable material is arranged.

The base is manufactured in particular from a non-expandable material.

In the context of this invention, the expression "non-expandable" means that the volume of a material changes by not more than or by less than 10% when the process steps provided for the material are carried out. This is in particular at a temperature of up to 160° C., in particular of 80° C. to 150° C., preferably of 90° C. to 140° C. In comparison with the expandable material, the base thus expands far less to not at all and remains substantially in its original shape even in the expanded state of the insulating element.

The base element may consist of any desired materials. Preferred materials are plastics, in particular polyurethanes, polyamides, polyesters and polyolefins, preferably high-temperature-resistant polymers such as poly(phenylene ethers), polysulfones or polyether sulfones, which may in particular also be foamed; metals, in particular aluminium and steel; or grown organic materials, in particular wood or other (densified) fibrous materials, or glass-type or ceramic materials; especially also foamed materials of this type; or any desired combinations of these materials. Polyamide, in particular polyamide 6, polyamide 6.6, polyamide 11, polyamide 12 or a mixture thereof, is particularly preferably used.

Combinations of the aforementioned materials with fibres, such as for example glass fibres or carbon fibres, are also possible, Glass fibre-reinforced plastics (GFRP) or carbon fibre-reinforced plastics (CFRP) are particularly preferred.

Furthermore, the base element may have any desired construction and any desired structure. For example, it may be solid, hollow and/or foamed and/or have a grid-like structure. Typically, the surface of the base element may be smooth, rough and/or structured. Particularly preferably, the base is configured as a strip-shaped element and/or as a cuboidal element.

In principle, the expandable material may be fastened to the base in a material-bonding, force-fitting and/or form-fitting manner. Material-bonding fastening is preferred in the present case, if need be in combination with form-fitting fastening.

According to one particularly advantageous embodiment, the expandable material is injected and/or adhesively bonded, in particular injected, onto the base.

If the base consists of a material that can be processed by injection moulding, a two-component injection moulding process can be used for example for producing the insulating element. In this case, first of all a first component, in this case the base, is injected. After this first component has solidified, the cavity in the mould is enlarged, or adapted, or the moulding produced is placed into a new mould, and a second component, in this case the expandable material, is overmoulded onto the first component with a second injection apparatus.

If the base consists of a material that cannot be produced by the injection moulding process, that is to say for example of a metal, the base element is placed into a corresponding mould and the expandable material is overmoulded onto the base element. Of course, it is also possible to fasten the expandable material to the base by specific fastening means or processes instead of, or in addition to, the overmoulding.

The base extends in the direction of the longitudinal axis of the insulating element, in particular at least along 75%, in particular at least along 90%© or along 100%, of the entire length of the insulating element. As a result, the expandable material is supported in the best way possible, such that it can be positioned precisely in the cavity.

In particular, the expandable material in the unexpanded state encloses the base in a form-fitting manner in some regions, in particular the expandable material in the unexpanded state encloses one or more protrusions of the base. The expandable material, even in the unexpanded state, can thus be fixed to the base without additional measures, or the fixing to the base can be improved.

In particular, the expandable material in the unexpanded state covers a lateral surface, which is along the longitudinal axis of the insulating element, of the base to an extent of at least 40%, in particular to an extent of at least 50%, preferably to an extent of at least 60% or at least 75%. Specifically, the expandable material in the unexpanded state covers a lateral surface, which is along the longitudinal axis of the insulating element, of the base to an extent of 100%. This makes complete filling of the cavity possible, even with relatively thin layers of expandable material, and is beneficial for a homogeneous distribution of material in the expanded state.

It may also be advantageous if the base has recesses and/or breakthroughs, which in particular extend from an outer surface of the insulating element into the interior of and/or through the base. It is consequently possible for the expandable material to be conducted during the expansion into the base and/or through the base into regions in which e.g. no expandable material is present on the base. As a result, after expansion of the expandable material has taken place, the base can be embedded completely into the expanded material, avoiding undesired free spaces. Overall, this is beneficial for the insulating action.

The recesses and/or breakthroughs can be, for example, of a cylindrical and/or cuboidal configuration.

According to a further advantageous embodiment, the expandable material in the unexpanded state is present in the region of a surface of the insulating element in multiple spatially separate regions. The surface of the insulating element is in this case formed by multiple regions with expandable material, which are separate from one another, and the uncovered surface of the base. In this case, the expandable material only partially covers the base. In principle, the expandable material in the unexpanded state in the spatially separate regions can be interconnected by material bridges, which for example run in the interior of the base. Such spatially separate arrangements of the expandable material on the surface may be advantageous, in order to control in a targeted manner the distribution of the expandable material in the cavity during the expansion.

In particular, the spatially separate regions of expandable material in the unexpanded state form rectangular, quadratic and/or circular regions on the surface of the insulating element.

Particularly preferably, the spatially separate regions of expandable material in the unexpanded state, together with the uncovered surface regions of the base, form a regular pattern. In particular, the latter is a chequerboard pattern, a stripe pattern or a point pattern.

In this respect, it may be advantageous if recesses and/or breakthroughs are present in the base in at least some of the regions between the spatially separate regions with expandable material and extend from an outer surface of the insulating element into the interior of and/or through the base.

According to a further advantageous embodiment, the expandable material in the unexpanded state forms a one-piece and/or coherent body. In particular, this is in combination with a base which is preferably formed as a strip-shaped element and extends substantially along the entire length of the insulating element.

It is particularly advantageous if the expandable material in the unexpanded state covers a lateral surface, which is along the longitudinal axis of the insulating element, of the base to an extent of at least 50%, in particular 60-90%. In this case, the surface not covered by expandable material preferably forms a coherent surface region of the base, in particular a stripe-shaped region running in a direction along the longitudinal axis.

According to one particularly preferred embodiment, the insulating element has in a direction along the longitudinal axis alternating protrusions and recesses, each of which in the unexpanded state is covered with expandable material. As a result, in particular the expansion of the expandable material can be controlled.

Preferably, the insulating element is connected to the structural element by a material-bonding, force-fitting and/or form-fitting connection, such that the position of the insulating element is fixed even with the expandable material in the unexpanded state.

For this purpose, the insulating element, in particular a base of the insulating element, has at least one fastening device for fastening the insulating element to the structural element. This may be, for example, a tab, a protrusion and/or a bore.

A further aspect of the present invention relates to an insulating element which is suitable for use in a structural element as described above. This insulating element is configured in particular as described above.

Details and advantages of the invention will be described below on the basis of exemplary embodiments and with reference to schematic drawings.

BRIEF DESCRIPTION OF THE DRAWINGS

The drawings used to explain the exemplary embodiments show.

WAYS OF CARRYING OUT THE INVENTION

Figure 1:
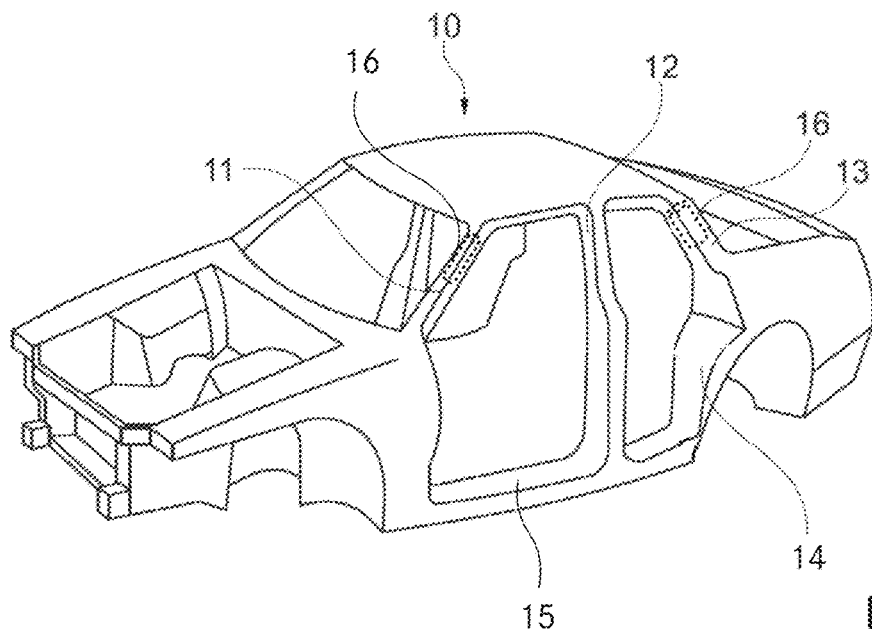
FIG. 1 a schematic, exemplary illustration of a body of a motor vehicle.

FIG. 1 schematically illustrates a body 10 of a motor vehicle. In this context, the body 10 has various structural elements with cavities, such as for example the A-pillar 11, the B-pillar 12, the C-pillar 13, the wheel well 14 or the side sill 15. Such structural elements with cavities can now be acoustically insulated by insulating elements 16 according to the invention, which are illustrated schematically in FIG. 1 as cylindrical elements.

Figure 2:
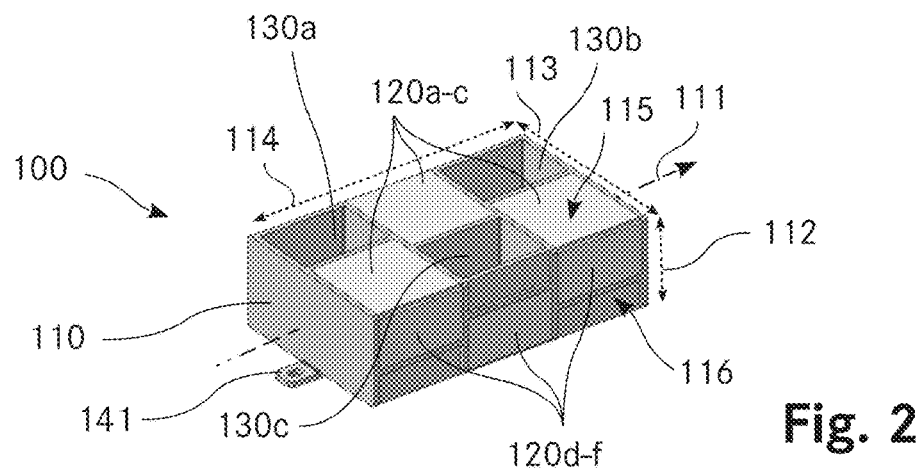
FIG. 2 a perspective view of a cuboidal insulating element obliquely from above.

FIG. 2 shows a perspective view of a cuboidal insulating element 100. The insulating element 100 has a cuboidal base 110 with a longitudinal axis 111 running parallel to the longitudinal edges of the base 110. The base 110 consists of e.g. nylon. In this case, a length 114 of the base 110, measured in the direction of the longitudinal axis 111, is approx. 1.5 times greater than the width 113 of the base 110, measured perpendicular to the longitudinal axis 111, and approx. 3 times greater than the height 112 of the base 110, measured perpendicular to the longitudinal axis 111. The length 114 can amount to e.g. 7.5 cm, while the width 113 measures approx. 5 cm and the height 112 approx. 2.5 cm.

In the region of the upper, large side face 115 of the base 110, three spatially separate and quadratic layers 120*a*, 120*b*, 120*c* of expandable material are applied to the surface of the base 110 in a chequerboard pattern. In the regions adjacent to the quadratic layers 120*a-c*, three cuboidal recesses 130*a*, 130*b*, 130*c* are arranged and extend into the interior of the base 110.

In the region of the front and smaller side face 116 of the base 110, three spatially separate and rectangular layers 120*d*, 120*e*, 120*f* of expandable material are applied to the surface of the base 110, likewise in a chequerboard pattern. In the regions between the rectangular layers 120*d*, 120*e*, 120*f*, the substantially planar front side face 116 of the base 110 is exposed. The end faces of the base 110, which are perpendicular to the longitudinal axis 110, are likewise exposed or are not covered with expandable material.

The rear side face (not illustrated in FIG. 2) is configured in the same manner as the front side face 116 and correspondingly likewise bears three spatially separate and rectangular layers of expandable material.

Figure 3:
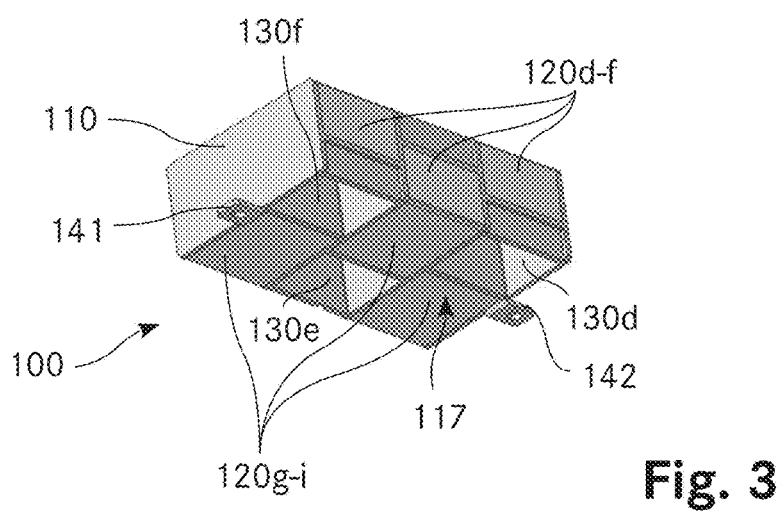
FIG. 3 a perspective view of the cuboidal insulating element of FIG. 2 obliquely from below.

As shown in FIG. 3, three spatially separate and quadratic layers 120*g*, 120*h*, 120*i* of expandable material are in turn applied to the lower side face 117, which is opposite the upper side face 115, in a chequerboard pattern. In the regions adjacent to the quadratic layers 120g-i, three cuboidal recesses 130d, 130e, 130f are arranged and extend into the interior of the base 110.

A protrusion 141, 142 with a bore is arranged on each of the opposite end faces of the base, in each case in a central region of the bottom edge, with which protrusions the insulating element 100 can be fastened in a structural element.

The expandable material of the insulating element 100, which is activatable for example by the action of heat, is in the unexpanded state in FIGS. 2 and 3 and is selected e.g. such that it has a rate of expansion of, for example, 1 000% and has an open cell structure in the expanded state.

Figure 4:
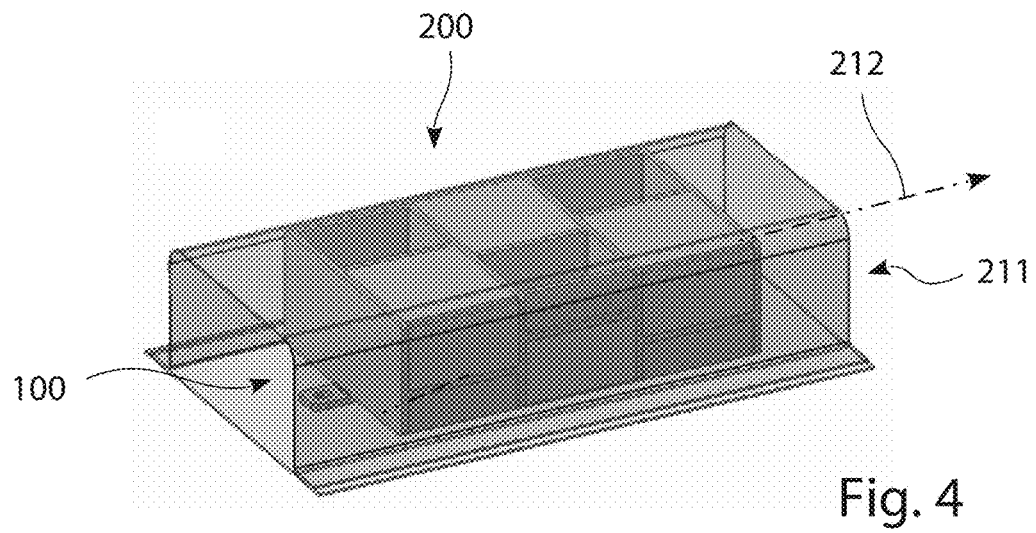
FIG. 4 a perspective view of a portion of an elongate and hollow structural element of a motor vehicle in a semitransparent illustration with the insulating element of FIG. 2 arranged therein.

FIG. 4 shows a portion of an elongate structural element 200 of a motor vehicle, e.g. a portion of an A-pillar. The structural element 200 has a cuboidal cavity 211 with a longitudinal axis 212, the insulating element 100 of FIGS. 2 and 3 being in the cavity 211. In this respect, the longitudinal axis of the insulating element 100 runs substantially parallel to the longitudinal axis 212 of the cavity 211. The insulating element 100 is fastened in the structural element 200 by means of the protrusions 141, 142.

Figure 5:
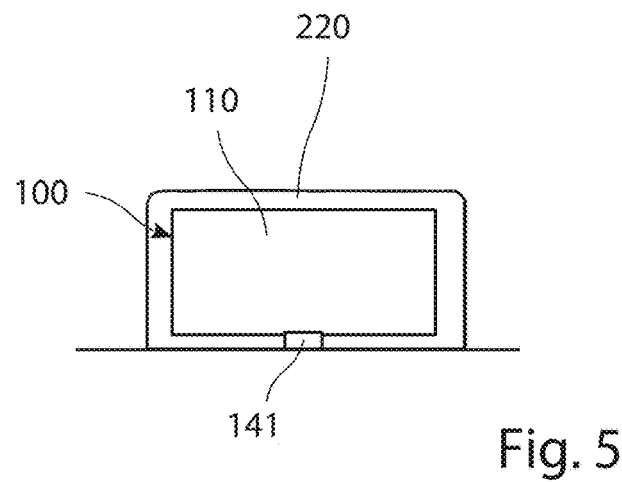
FIG. 5 a view along the longitudinal axis onto the structural element of FIG. 2, the expandable material being in the unexpanded state.

FIG. 5 shows a view onto the structural element 200 from the side on the left in FIG. 4, the expandable material being in the unexpanded state as in FIGS. 2 and 3. In this case, a free space 220 is present between the insulating element 100 and the inner wall of the structural element 200 and encloses the lateral surface of the insulating element 100.

Figure 6:
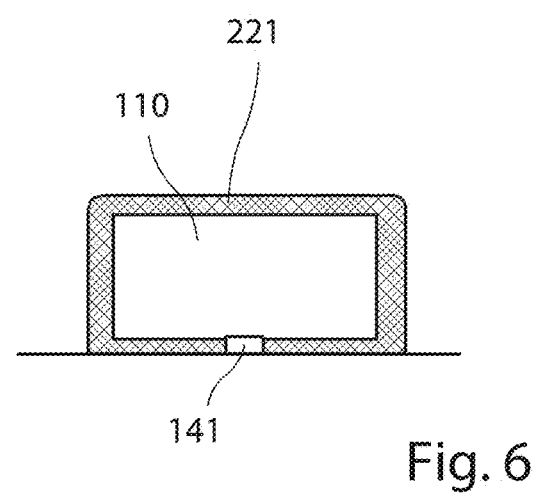
FIG. 6 the situation of FIG. 5 after expansion of the expandable material has taken place.

FIG. 6 shows the situation after expansion of the expandable material has taken place, e.g. after the action of heat. The original free space 220, like the recesses present in the base 110 (see FIGS. 2 and 3), is now completely filled with a foam body 221 of expandable material in the expanded state. Here, the foam body 221 extends along the entire length 114 (see FIGS. 2 and 3) of the insulating element 100.

Acoustic insulation is therefore achieved along the longitudinal axis 212 of the cavity 211 of the structural element 200 as well as in all directions perpendicular thereto.

Figure 7:
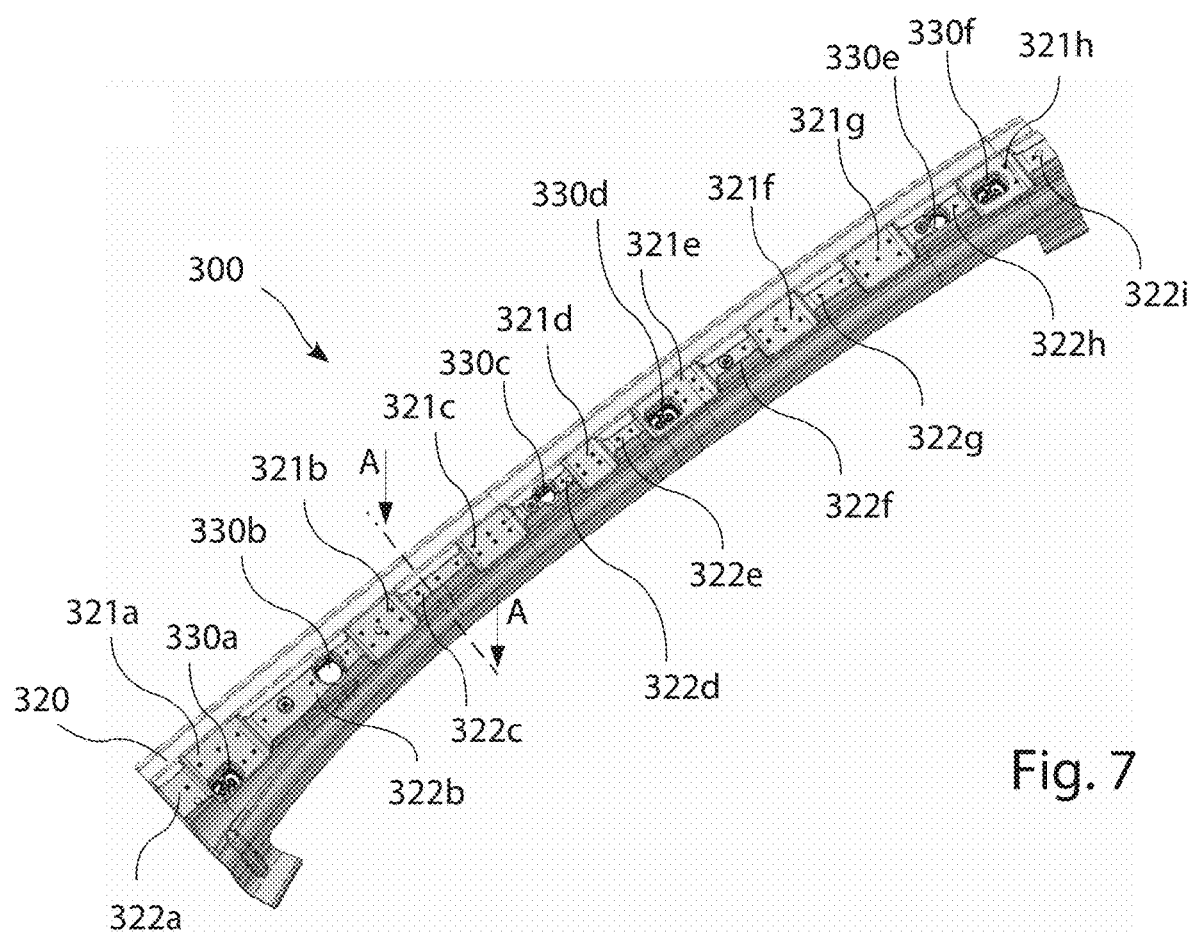
FIG. 7 a view onto the top side of a further insulating element, which is provided for insulating an A-pillar of a motor vehicle.
Figure 8:
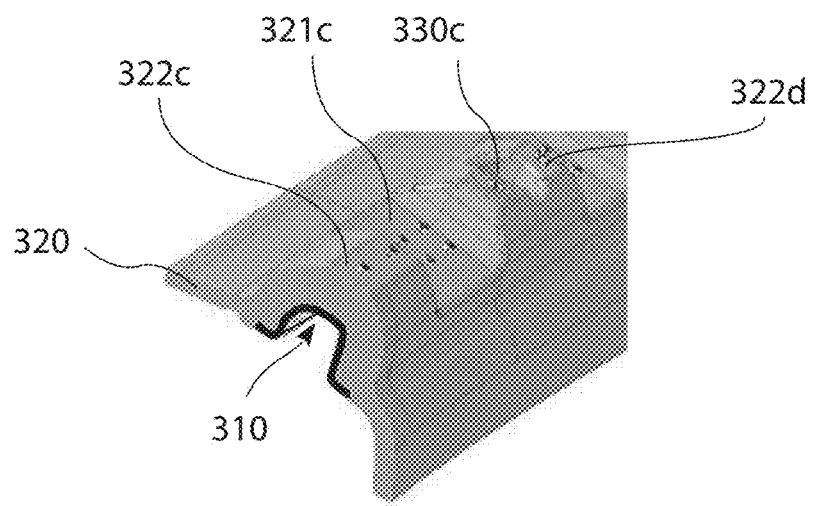
FIG. 8 a perspective view of the cross-section in the region of the line A-A in FIG. 7.
Figure 9:
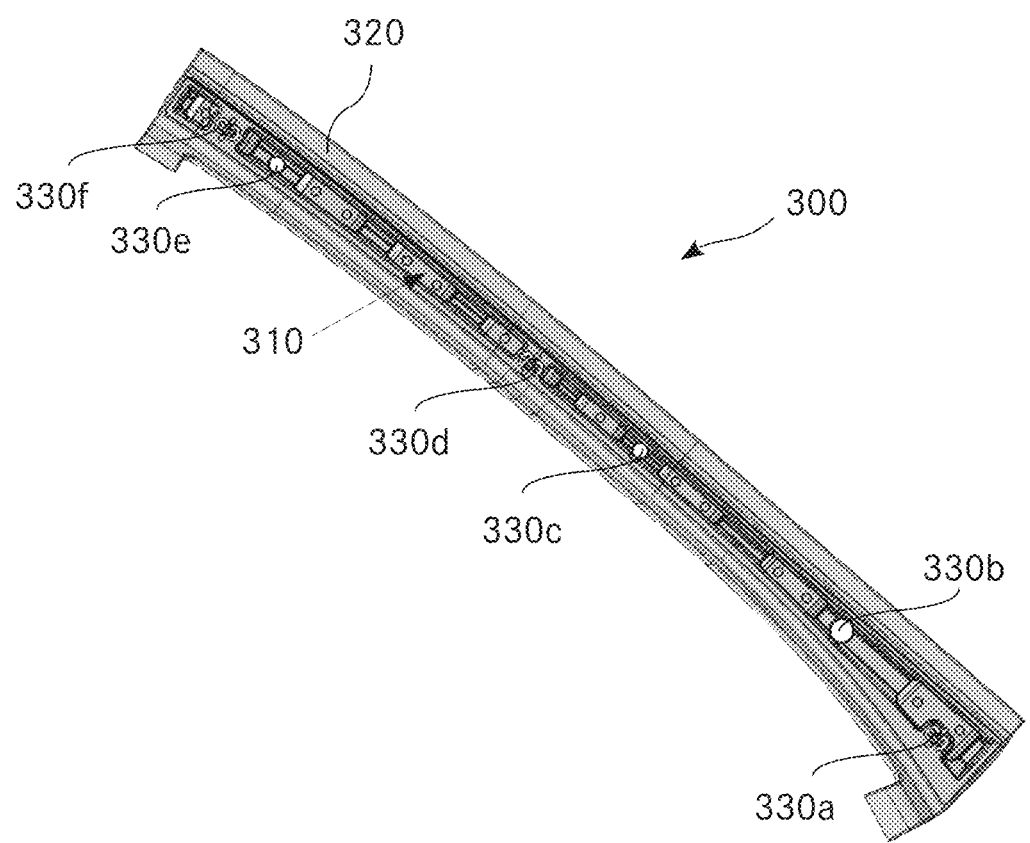
FIG. 9 a view onto a bottom side of the insulating element of FIG. 7.

FIG. 7-9 show a further, elongate insulating element 300, which is provided for insulating an A-pillar of a motor vehicle. The insulating element 300 has a base 310 (see FIG. 8), on which a body 320, which is of one piece and coherent in the unexpanded state, of an expandable material has been injected.

The base 310 extends substantially along the entire length in a central region of the insulating element 300 and has the shape of a profiled strip. The expandable material 320 covers the base 310 on the outer surface (top side in FIG. 8, convex region of the base), while the base 310 is uncovered on the opposite inner surface (bottom side in FIG. 8, concave region of the base). Furthermore, the expandable material 320 encloses various projections (not designated more specifically) on the base in a form-fitting manner.

The insulating element 300 has, along the longitudinal direction and in an alternating manner, flattened protrusions 322a, 322b, 322c, 322d, 322e, 322f, 322g, 322h, 322i and flattened recesses 321a, 321b, 321c, 321d, 321e, 321f, 321h.

Moreover, along the longitudinal direction of the insulating element 300, breakthroughs 330a, 330b, 330c, 330d, 330e, 330f are incorporated, in the body 320 of expandable material and in the base 310 lying therebeneath.

The length of the insulating element 300 amounts to e.g. 55 cm, while the width and height each measure approx. 5 cm. The expandable material is for example the same as that used for the first insulating element 100.

The exemplary embodiments described above should be understood merely as illustrative examples which can be modified as desired within the scope of the invention.

LIST OF REFERENCE SIGNS

10 Body
11 A-pillar
12 B-pillar
13 C-pillar
14 Wheel well
15 Door sill
16 Insulating element (non-specific)
100 Cuboidal insulating element
110 Cuboidal base
111 Longitudinal axis
112 Height
113 Width
114 Length
115 Upper side face
116 Front side face
117 Lower side face
120a . . . c Quadratic layers of expandable material
120d . . . f Rectangular layers of expandable material
120g . . . i Quadratic layers of expandable material
130a . . . f Recesses
141, 142 Protrusions with bores
200 Structural element
211 Cavity
212 Longitudinal axis
220 Free space
221 Expanded foam body
300 Further insulating element
310 Base
320 Body of expandable material
321a . . . h Recesses
322a . . . i Protrusions
330a . . . f Breakthroughs

The invention claimed is:

1. A structural element of a motor vehicle, wherein the structural element has a cavity and an elongate insulating element is arranged in the cavity such that a longitudinal axis of the insulating element is oriented substantially parallel to a longitudinal axis of the cavity, wherein
the insulating element comprises a base and an expandable material that is arranged on the base, the base having alternating protrusions and recesses in a direction along the longitudinal axis, and the expandable material covering each of the protrusions and recesses in an unexpanded state so as to form corresponding protrusions and recesses on the insulating element, and wherein (i) in the unexpanded state, the expandable material extends in the direction of the longitudinal axis of the insulating element at least along 75%, of the entire length of the insulating element, (ii) in the unexpanded state, the expandable material forms a body having a width that is greater than a width of the base, (iii) the expandable material is arranged and/or configured in such a way that the insulating element fills the cavity completely along the entire length of the insulating element when the expandable material is in an expanded state, and (iv) the expandable material has an expansion rate of more than 1,500% and a modulus of elasticity of 5 MPa or less.

2. The structural element according to claim 1, wherein a ratio of the length of the insulating element in the unexpanded state to a width and/or to a height of the insulating element in the unexpanded state is >0.5.

3. The structural element according to claim 1, wherein the expandable material is configured in such a way that in the expanded state it forms an open cell structure.

4. The structural element according to claim 1, wherein the base is manufactured from a non-expandable material.

5. The structural element according to claim 1, wherein the expandable material in the unexpanded state is present in the region of a surface of the insulating element in multiple spatially separate regions.

6. The structural element according to claim 5, wherein, on a surface of the insulating element, the spatially separate regions form a regular pattern.

7. The structural element according to claim 1, wherein the body of the expandable material is a one-piece and/or unitary body.

8. The structural element according to claim 1, wherein the expandable material in the unexpanded state encloses the base in a form-fitting manner in some regions.

9. The structural element according to claim 1, wherein the insulating element with the expandable material in the unexpanded state has a smaller volume than a portion of the cavity in which the insulating element is present.

10. An elongate insulating element comprising a base and an expandable material that is arranged on the base, the base having alternating protrusions and recesses in a direction along a longitudinal axis of the insulating element, and the expandable material covering each of the protrusions and recesses in an unexpanded state so as to form corresponding protrusions and recesses on the insulating element, and wherein (i) in the unexpanded state, the expandable material extends in the direction of the longitudinal axis of the insulating element at least along 75%, of the entire length of the insulating element, (ii) in the unexpanded state, the expandable material forms a body having a width that is greater than a width of the base, and (iii) the expandable material has an expansion rate of more than 1,500% and a modulus of elasticity of 5 MPa or less.

11. The structural element according to claim 1, wherein each of the protrusions and recesses of the base include a first planar side wall on a first side of the respective protrusion or recess and a second planar side wall on an opposing second side of the respective protrusion or recess.

12. The structural element according to claim 11, wherein the expandable material covers the first side wall and the second side wall.

13. The structural element according to claim 1, wherein the expandable material is arranged to cover the base on an outer surface of the base, and does not cover the base on an opposite inner surface.

14. The structural element according to claim 1, wherein the expandable material is arranged on an outer convex surface of the base.

15. The structural element according to claim 1, wherein, in the unexpanded state, the body of the expandable material is arranged on the base so as to cover an edge of the base that extends in the longitudinal direction of the insulating element, and the body of expandable material is configured to form a flange that extends farther in a lateral direction than the edge of the base.

* * * * *